Oct. 21, 1958 A. W. MEIER 2,857,213
OIL SEAL AND BEARING
Filed Nov. 3, 1955
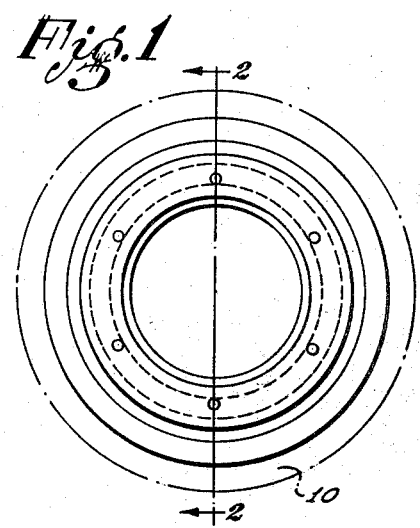
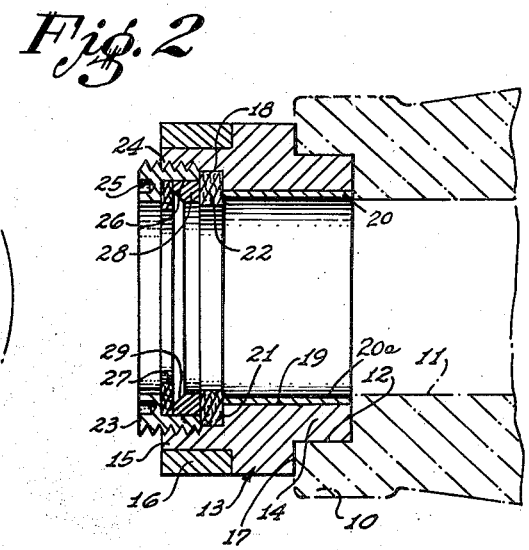
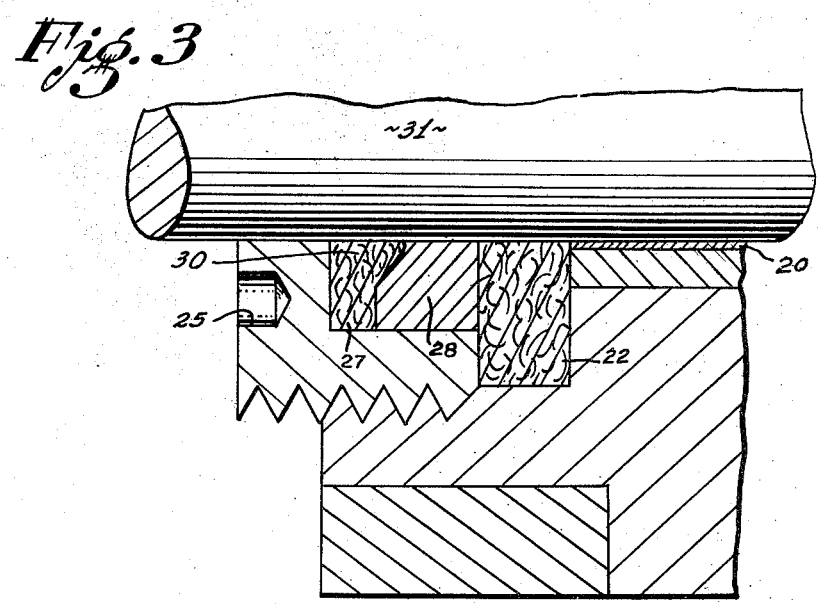
INVENTOR
Axel W. Meier
By George W. Wilson
His Patent Attorney

United States Patent Office 2,857,213
Patented Oct. 21, 1958

2,857,213

OIL SEAL AND BEARING

Axel W. Meier, Bellflower, Calif.

Application November 3, 1955, Serial No. 544,697

8 Claims. (308—36.1)

My invention relates to oil seals and bearings for mechanisms and machines and is particularly designed to provide a combined alignment bearing and oil seal for shafts subject to vibration and oscillation while in operation.

My invention will hereinafter be described by way of illustrative embodiment, as applied to a typical modern automobile, to seal the outboard end of the short drive shaft projecting rearwardly from the transmission casing extension and carrying at its rearward end one member of the universal joint located at the forward end of the automobile drive shaft.

The drive shaft projecting through the transmission extension of most modern cars is short in length within the casing but transmits the whole torque of the engine and considerable play exists or soon develops in the universal joint to which the shaft extends. The short shaft therefore is subjected to constant fluctuations in power transmitted together with constant small angular changes in the axis of the thrust transmitted.

A bearing for the shaft is provided at the outboard end of the housing extension which is generally provided with an oil seal in the form of a synthetic rubber ring mounted within the bearing. The constant play in the short shaft quickly wears the central opening in the oil seal into non-circular shape thus not only causing leakage of oil from the casing but setting up looseness in the bearing which soon reaches a degree requiring replacement of the oil seal at least, and often of the bearing also. The increasing play of the shaft also of course causes excess wear in the universal joint. The result of wear in the oil seal and bearing can be clutch chatter and engine vibration if wear becomes excessive.

It is the general purpose of my invention to provide a combined oil seal and bearing for a shaft projecting from a housing and subjected to heavy stresses which oil seal and bearing are arranged so as to ensure long and satisfactory service, and afford full support to the projecting end of the shaft to maintain the shaft in proper alignment in the housing.

With the above mentioned purpose in view an object of my invention is to provide a combined bearing and oil seal for a shaft in which the oil seal elements are located separately from the bearing elements so that normal wear of the oil seal does not affect the bearing, both oil seal and bearing however being mounted in a bearing body.

A further object of my invention is to provide the oil seal elements so that they may be readily adjusted or replaced without removing the bearing body from its position.

Another object of my invention is to provide an improved combined adjustable oil seal and bearing of rugged construction which may be installed without special tools and without danger of misalignment.

Another object of my invention is to provide an improved combined adjustable oil seal and bearing having the features above referred to arranged in a simple construction inexpensive to produce with accuracy at relatively low cost and well adapted to be used as a replacement for bearings of other forms initially installed.

Still further features of my invention will appear in the following specification read in conjunction with the accompanying drawings.

In the drawings:

Figure 1 is a front view of the combined bearing and seal of my invention mounted in the transmission case rear extension of an automobile.

Figure 2 is a section on the line 2—2 in Figure 1.

Figure 3 is a fragmentary section of the parts shown in Figure 2 but drawn on a larger scale and showing the drive shaft extending through the bearing and seal.

In the drawing the reference numeral 10 indicates the rearward end of a typical transmission case housing extension having an axial bore 11 which is counterbored at 12.

The body 13 of the combined bearing and seal of my invention is formed as a bushing of a tough metal and provided at one end with a reduced exterior diameter portion 14 which is driven into the counterbore 12 and with a second portion of reduced exterior diameter 15 at the opposite end, a sleeve of tough steel 16 being seated on and tightly gripping said second reduced diameter portion, the inner end of the sleeve 16 bearing against the shoulder formed by the reduction in the outside diameter of part 15 and therefore transmitting any blows delivered against the edge of the sleeve 16 through the body 13 to and against the rearward face 17 of the housing extension 10. Bearing body 13 is counterbored at its outer end as indiccated at 18.

The inner surface 19 of the bearing between the inner end and the counterbore 18 is furnished with a bearing portion or element provided by a steel sleeve 20 pressed therein and preferably provided with an antifriction lining 20a of "Babbitt" metal cast thereon.

Against the shoulder 21 at the inner end of the counterbore 18 and backed by the wall of the counterbore 18 a thick felt washer 22 is positioned which provides an oil seal. An exteriorly threaded adjusting gland nut 23 shown as fully screwed-in, Figures 2 and 3, is engaged in the interiorly threaded outer end 24 of the counterbore 18, the inner end of the nut engaging against and securely retaining the felt washer 22 in position. The nut 23 also enables the washer 22 to be compressed, as the inner face becomes worn, to take up the wear. The outer face of nut 23 is provided with shallow holes 25 adapted to be engaged by a peg wrench by which the nut may be adjusted, or removed to enable the felt washer to be renewed. Nut 23 is counterbored as indicated at 26 from its inner end toward its outer end. A wiper ring 27 of relatively hard synthetic rubber or other material is positioned against the shoulder at the outer end of the counterbore and held in position by a metal control ring 28 fitted between the felt washer 22 and wiper ring 27. The inner edge of the control ring 28 lying against the wiper ring is angled off, as indicated at 29, allowing the inner edge of the wiper ring 27 to be crowded inwardly, as indicated at 30 in Figure 3, by the shaft 31 and to hold lubricating oil, working past the felt washer 22, in the space provided by the removal of the forward edge of the control ring. It will be noted that since the material of the wiper ring 27 is relatively hard and the thickness of the wiper ring and control ring 28 equals the depth of the counterbore in the adjusting nut 23, the latter exerts a firm pressure over the side wall of the felt washer 22.

The described arrangement provides an oil seal construction spaced from the shaft bearing surface 20, and prevents the seal, by its arrangement between metal peripheral supporting walls, from being distorted by the small non-axial or whiping movements of the shaft 31 which constantly occur in the driving of the automobile.

The bearing and seal assembly may be easily installed by the use of the proper but well known tools. One tool which is used to drive the assembly into position in the housing extension 10, before shaft 31 is in position, has a portion of hemispherical shape, the edge of which rests against the end face of steel ring 16, the hemispherical portion being welded to a length of axially aligned shaft which slides snugly into the axial bore 11 through the slacked back oil seal assembly and projects outwardly to afford an axial projection which is hammered to drive the bearing body 13 into place. The force applied to the ring 16 cannot distort the bearing assembly since it is evenly distributed around the body 13 only. After the shaft 31 has been positioned, the oil seal assembly may be tightened by the use of a wrench to bring the parts thereof into operative relation relative to the shaft.

Normal wear of the oil seal may in time, although much less frequently than with known types of oil seals, require that the oil seal elements be renewed. This can be readily done by removing shaft 31, unscrewing nut 23, extracting felt washer 22 from the body 13 and the wiper ring from nut 23, replacing the felt washer and ring, replacing shaft 31, and tightening up nut 23.

A worn bearing and oil seal of the conventional type can be removed by the usual tools and replaced by the bearing and seal of my invention as above described.

Should the babbitt lined bearing of my device become worn as the result of long use, the bearing body may be removed by the use of the proper tools, and replaced as described.

A preferred embodiment of my invention has been particularly described with reference to the accompanying illustrative drawings, but it is to be understood that various changes may be made in the specific embodiment described by those skilled in the art without departing from the scope of the invention as defined by the appended claims.

What I claim is:

1. A combined bearing and oil seal for a shaft extending through a bore in the wall of a housing and the like, comprising: a tough metal bushing having an inner end portion of reduced outside diameter adapted to be mounted in said bore in the wall of the housing and an outer end portion of reduced outside diameter; a sleeve of tough metal mounted on said reduced outer diameter portion of the outer end of said bushing; a shaft bearing surface in said bushing; and an oil seal arrangement mounted in the outer end of said bushing in axial alignment with, but separate from, said bearing surface.

2. A combined bearing and oil seal for a shaft extending through a bore in the wall of a housing and the like, comprising: a tough metal bushing adapted to be mounted in said bore in the wall of the housing and having a shaft supporting surface provided within said bushing; a counterbore at the outer end of said bushing; a washer of oil absorbent material positioned against the inner end of the counterbore in the outer end of said bushing; an adjusting member counterbored from its inner end toward its outer end; and an oil wiper ring of harder material than said oil absorbent washer, said wiper ring being positioned at the outer end of the counterbore in said adjusting member.

3. A combined bearing and oil seal for a shaft extending through a bore in the wall of a housing and the like as set forth in claim 2 and in addition comprising a control ring mounted within said counterbored adjusting member between said wiper ring and the oil absorbent washer.

4. A combined bearing and oil seal for a shaft extending through a bore in the wall of a housing and the like, comprising: a tough metal bushing adapted to be mounted in the bore and rigidly supported therein by the wall of said bore; a tough metal ring immovably mounted around the outer periphery of said bushing in position to receive blows of a tool used in positioning said bushing in the bore; a shaft bearing surface in said bushing; and an oil seal arrangement mounted in the outer end of said bushing in axial alignment with, but separate from, said bearing surface.

5. A combined bearing and oil seal for a shaft extending through a bore in the wall of a housing and the like as set forth in claim 4 and in which said oil seal arrangement is provided in a counterbore at the outer end of said bushing and comprises; a washer of oil absorbent material positioned against the inner end of the counterbore in the ouer end of said bushing; and an adjusting nut arranged within the outer portion of the counterbored outer end of the bushing and bearing against said oil absorbent washer.

6. A combined bearing and oil seal for a shaft extending through a bore in the wall of a housing and the like as set forth in claim 5 and in which said adjusting nut is counterbored and a control ring mounted within said counterbored adjusting nut between a wiper ring and the oil absorbent washer.

7. A combined bearing and oil seal for a shaft extending through a bore in the wall of a housing and the like, comprising: a tough metal bushing adapted to be mounted in said bore; a hard metal backing mounted on said bushing; a lining of antifriction metal on said bushing providing a shaft bearing surface; a counterbore at the outer end of said bushing; a washer of oil absorbent material positioned against the inner end of the counterbore in the outer end of said bushing; an adjusting member arranged within the outer portion of the counterbored outer end of the bushing and bearing against said oil absorbent washer, said adjusting member being counterbored from its inner end toward its outer end; and an oil wiper ring of harder material than said oil absorbent washer, said wiper ring being positioned at the outer end of the counterbore in said adjusting member.

8. A combined bearing and oil seal for a shaft extending through a bore in the wall of a housing and the like as set forth in claim 7 and in addition comprising a control ring mounted within said counterbored adjusting member between said wiper ring and the oil absorbent washer.

References Cited in the file of this patent

UNITED STATES PATENTS

| | | |
|---|---|---|
| 1,230,065 | Cash | June 12, 1912 |
| 1,510,806 | Snider | Oct. 7, 1924 |
| 1,873,146 | Patch | Aug. 23, 1932 |
| 1,981,500 | Frelin | Nov. 20, 1934 |
| 2,096,597 | Seabrooks | Oct. 19, 1937 |
| 2,562,624 | Loofbourrow | July 31, 1951 |
| 2,573,138 | Gerner | Oct. 30, 1951 |

FOREIGN PATENTS

| | | |
|---|---|---|
| 260,347 | Great Britain | Oct. 28, 1926 |